United States Patent
Nakayama

(10) Patent No.: US 9,727,038 B2
(45) Date of Patent: Aug. 8, 2017

(54) FUEL CELL CONTROL USING PSEUDO POWER CONSUMPTION

(71) Applicant: KYOCERA CORPORATION, Kyoto (JP)

(72) Inventor: Taku Nakayama, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 493 days.

(21) Appl. No.: 14/348,028

(22) PCT Filed: Sep. 28, 2012

(86) PCT No.: PCT/JP2012/075248
§ 371 (c)(1),
(2) Date: Mar. 27, 2014

(87) PCT Pub. No.: WO2013/047840
PCT Pub. Date: Apr. 4, 2013

(65) Prior Publication Data
US 2014/0236370 A1  Aug. 21, 2014

(30) Foreign Application Priority Data
Sep. 28, 2011  (JP) .................................. 2011-213564

(51) Int. Cl.
*G05B 15/02* (2006.01)
*H01M 8/04858* (2016.01)
(Continued)

(52) U.S. Cl.
CPC ........ *G05B 15/02* (2013.01); *H01M 8/04604* (2013.01); *H01M 8/04932* (2013.01);
(Continued)

(58) Field of Classification Search
None
See application file for complete search history.

(56) References Cited

U.S. PATENT DOCUMENTS

2007/0264546 A1* 11/2007 LaVen ............... H01M 8/04089
429/416
2011/0137482 A1    6/2011 Toba et al.

FOREIGN PATENT DOCUMENTS

JP    10-228919 A    8/1998
JP    H11-31521 A    2/1999
(Continued)

OTHER PUBLICATIONS

International Search Report; PCT/JP2012/075248; Dec. 11, 2012.
(Continued)

*Primary Examiner* — Eric C Wai
(74) *Attorney, Agent, or Firm* — Procopio Cory Hargreaves and Savitch LLP

(57) ABSTRACT

A power management system 1 is provided with an HEMS 500 connected to an SOFC unit 100 and a load 400. The power management system comprises: a reception unit 510 that acquires power consumption of the load; and a transmission unit 520 that notifies the SOFC unit 100 of pseudo power consumption that is obtained by adding a predetermined offset to the power consumption acquired by the a reception unit 510. The SOFC unit 100 controls power output from the SOFC unit 100 to follow the pseudo power consumption.

5 Claims, 3 Drawing Sheets

(51) Int. Cl.
*H01M 8/04537* (2016.01)
*H02J 3/38* (2006.01)
*H02J 4/00* (2006.01)
*H02J 3/14* (2006.01)
*H02J 13/00* (2006.01)
*H01M 8/124* (2016.01)

(52) U.S. Cl.
CPC .................................. *H02J 3/14* (2013.01); *H02J 3/38* (2013.01); *H02J 3/387* (2013.01); *H02J 4/00* (2013.01); *H02J 13/0062* (2013.01); *H01M 2008/1293* (2013.01)

(56) References Cited

FOREIGN PATENT DOCUMENTS

| JP | 2006-060932 A | 3/2006 |
|----|---------------|--------|
| JP | 2006-092882 A | 4/2006 |
| JP | 2009-259578 A | 11/2009 |
| JP | 2009-284723 A | 12/2009 |
| JP | 2010-015783 A | 1/2010 |
| JP | 2010-017076 A | 1/2010 |
| JP | 2010-092726 A | 4/2010 |
| JP | 2010-182073 A | 8/2010 |
| JP | 2011-139577 A | 7/2011 |
| JP | 2011-142033 A | 7/2011 |
| JP | 2011-185570 A | 9/2011 |

OTHER PUBLICATIONS

Office Action dated Aug. 25, 2015, issued in counterpart Japanese application No. 2011-213564.

Office Action dated Aug. 25, 2015, issued in counterpart Japanese application No. 2012-174458.

Extended European Search Report dated Nov. 20, 2015 issued by the European Patent Office for Counterpart European Application No. 12837373.5.

An Office Action; "Notice of Reasons for Rejection," issued by the Japanese Patent Office on Dec. 16, 2014, which corresponds to Japanese Patent Application No. 2011-213564 and is related to U.S. Appl. No. 14/348,028; with English language statement of relevance.

* cited by examiner

FUEL CELL CONTROL USING PSEUDO POWER CONSUMPTION

TECHNICAL FIELD

The present invention relates to a power management system provided with a fuel cell unit and a load, a power management apparatus, and a power management method.

BACKGROUND ART

In recent years, it is known a technology of controlling, for example, a load provided in a consumer or a dispersed power source provided in a consumer by a power management apparatus (for example, HEMS: Home Energy Management System) provided in each consumer.

Examples of the dispersed power source may include a fuel cell unit including a fuel cell such as an SOFC (Solid Oxide Fuel Cell). Examples of the dispersed power source may include a power generation equipment that utilizes clean energy such as sunlight, wind power, or geothermy.

In this case, generally, the power output from the fuel cell unit is controlled to follow power consumption of a load provided in a consumer (for example, Patent Literature 1). However, there is a case where when the power consumption of a load provided in a consumer rapidly increases, the power output from the fuel cell unit cannot follow the power consumption of the load.

As measures for such a case, a technology has been proposed which prevents shortfall of the power supplied to the load even when the power consumption of the load provided in a consumer rapidly increases, by providing a large-capacity battery or capacitor.

However, in the above-described technology, it is needed to provide a large-capacity battery or capacitor, and a cost of a whole system including the fuel cell unit rises.

CITATION LIST

Patent Literature

Patent Literature 1: Japanese Patent Application Publication No. 2010-15783

SUMMARY OF THE INVENTION

A power management system according to the first feature of the present invention is provided with a fuel cell unit and a load. The power management system comprises: an acquisition unit that acquires power consumption of the load; and a notification unit that notifies the fuel cell unit of pseudo power consumption that is obtained by adding a predetermined offset to the power consumption acquired by the acquisition unit. The fuel cell unit controls power output from the fuel cell unit to follow the pseudo power consumption.

In the first feature, the power management system further comprises a control unit that predicts the power consumption of the load and calculates the predetermined offset on the basis of the predicted power consumption.

In the first feature, the power management system further comprises a control unit that predicts the power consumption of the load and reduces the power consumption of the load when the power output from the fuel cell unit cannot follow the predicted power consumption.

In the first feature, as the load, a plurality of loads are provided. A control unit is provided that reduces the power consumption of the load selected from among the plurality of loads when the power output from the fuel cell unit cannot follow the power consumption of the plurality of loads. The control unit selects the load the power consumption of which is to be reduced, depending on a characteristic of each of the plurality of loads.

A power management apparatus according to the second feature of the present invention is connected to a fuel cell unit and a load. The power management apparatus comprises: an acquisition unit that acquires power consumption of the load; and a notification unit that notifies the fuel cell unit of pseudo power consumption that is obtained by adding a predetermined offset to the power consumption acquired by the acquisition unit.

A power management method according to the third feature of the present invention is used for a power management system provided with a fuel cell unit and a load. The power management method comprises: a step A of acquiring power consumption of the load; a step B of notifying the fuel cell unit of pseudo power consumption that is obtained by adding a predetermined offset to the power consumption acquired in the step A; and a step C of controlling power output from the fuel cell unit to follow the pseudo power consumption.

DESCRIPTION OF THE EMBODIMENT

Figure 1:
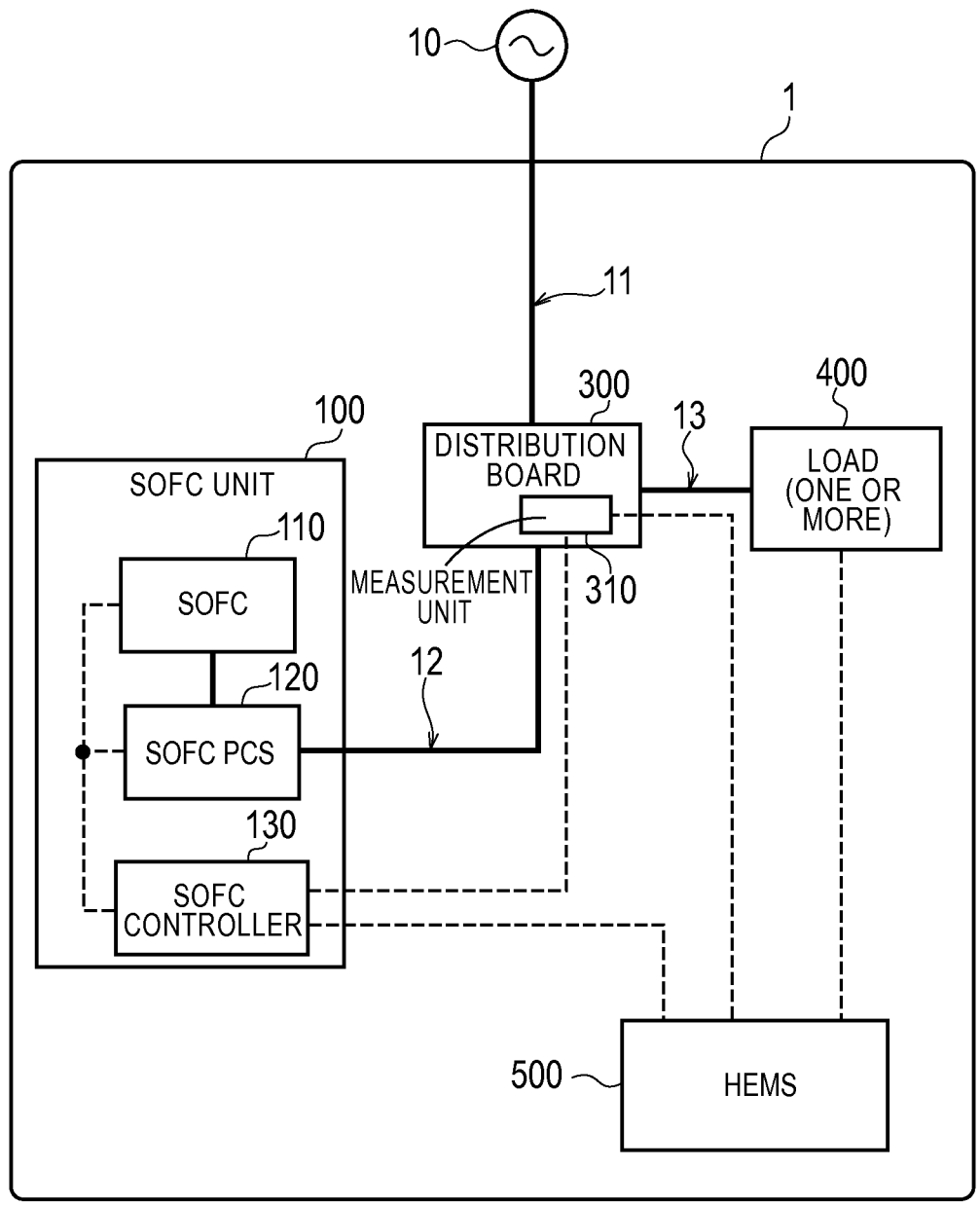
FIG. 1 is a diagram of a power management system 1 according to the first feature.

With reference to the drawings, the power management system according to the embodiment of the present invention will be described. In the drawings of the following embodiments, the same or similar reference signs are applied to the same or similar portions.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

Summary of the Embodiment

The power management system according to the embodiment is provided with a fuel cell unit and a load. The power management system comprises: an acquisition unit that acquires power consumption of the load; and a notification unit that notifies the fuel cell unit of pseudo power consumption that is obtained by adding a predetermined offset to the power consumption acquired by the acquisition unit. The fuel cell unit controls power output from the fuel cell unit to follow the pseudo power consumption.

According to the embodiment, the notification unit notifies the fuel cell unit of pseudo power consumption that is obtained by adding a predetermined offset to the power consumption of the load. The fuel cell unit controls the power output from the fuel cell unit to follow the pseudo power consumption. In other words, the fuel cell unit controls the power output from the fuel cell unit, allowing for a margin of the predetermined offset.

Therefore, a load followability is improved by the predetermined offset, without providing the large-capacity battery or capacitor. That is, it is possible to restrain a cost increase of a whole system including the fuel cell unit and to restrain shortage of power supplied from the fuel cell unit to the load.

First Embodiment (Power management system)

Hereinafter, a power management system according to a first embodiment will be described. FIG. 1 is a diagram of a power management system 1 according to the first embodiment.

As shown in FIG. 1, the power management system 1 includes an SOFC unit 100, a distribution board 300, a load 400, and an HEMS 500.

The SOFC unit 100 is a unit including equipment (Solid Oxide Fuel Cell) that outputs power (for example, DC power) by a chemical reaction between hydrogen extracted from natural gas, for example, and oxygen in the air. The SOFC unit 100 is an example of a fuel cell unit.

In particular, the SOFC unit 100 includes an SOFC 110, an SOFC PCS 120, and an SOFC controller 130.

The SOFC 110 is equipment (Solid Oxide Fuel Cell) that generates power (for example, DC power) by a chemical reaction between hydrogen extracted from gas, etc., and oxygen in the air. The SOFC 110 is an example of the fuel cell. An amount of power generated by the SOFC 110 varies depending on an amount of gas and air supplied to the SOFC 110. The amount of gas and air supplied to the SOFC 110 is controlled by the SOFC 130.

The SOFC PCS 120 converts the DC power output from the SOFC 110 into AC power. The SOFC PCS 120 outputs the AC power to the distribution board 300 via a power line 12.

The SOFC controller 130 performs control for performing a load following operation. Specifically, the SOFC controller 130 controls the SOFC 110 so that the power output from the SOFC unit 100 (SOFC 110) follows the power consumption of the load 400.

The SOFC controller 130 decides a target output power value of the SOFC unit 100 (SOFC 110) so that the power supplied from a grid 10 reaches a predetermined value (for example, zero). The SOFC controller 130 controls the SOFC 110 so that the power output from the SOFC unit 100 (SOFC 110) reaches a target output power value.

In the first embodiment, the power supplied from the grid 10 is measured by a measurement unit 310 which will be described later, for example. It should be noted, however, that the SOFC controller 130 refers to the pseudo power consumption that is notified by the HEMS 500 which will be described later to decide the target output power value of the SOFC unit 100 (SOFC 110) so that a value obtained by excluding the pseudo power consumption from the power supplied from the grid 10 reaches a predetermined value (for example, zero).

The power supplied from the grid 10 varies depending on the power consumption of the load 400. Therefore, it should be noted that even in a case of deciding the target output power value according to the power supplied from the grid 10, the power output from the SOFC unit 100 (SOFC 110) follows the power consumption of the load 400.

Alternatively, the SOFC controller 130 decides the target output power value equal to the power consumption of the load 400. The SOFC controller 130 controls the SOFC 110 so that the power output from the SOFC unit 100 (SOFC 110) reaches a target output power value.

In the first embodiment, the power consumption of the load 400 is measured by the measurement unit 310 which will be described later, for example. However, it should be noted that the SOFC controller 130 decides the target power value equal to the pseudo power consumption that is notified by the HEMS 500 which will be described later.

The distribution board 300 is connected to the grid 10 via a power line 11, connected to the SOFC unit 100 via a power line 12, and connected to the load 400 via a power line 13. The distribution board 300 distributes the power supplied from the grid 10 via the power line 11 and the power supplied from the SOFC unit 100 via the power line 12, to the load 400 via the power line 13.

In the first embodiment, the distribution board 300 includes the measurement unit 310. The measurement unit 310 measures the power supplied from the grid 10. That is, the measurement unit 310 measures the power consumption of the load 400 provided downstream (at the side away from the grid 10) of the measurement unit 310. In addition to the measurement unit 310, a measurement unit that measures the power consumption of the load 400 may be provided.

When there are provided a plurality of loads 400, a measurement unit that measures a sum of power consumption of the loads 400 may be provided, or a measurement unit that individually measures power consumption of each load 400 may be provided.

In this case, the measurement unit 310 is connected to the SOFC unit 100 and the HEMS 500 via a signal line, and transmits a measured value to the SOFC unit 100 and the HEMS 500.

The load 400 is equipment that consumes the power supplied via the power line 13. Examples of the load 400 include equipment such as a refrigerator, lighting, an air conditioner, and TV. The load 400 may be single equipment, and may include a plurality of equipment.

The HEMS 500 is an apparatus (HEMS: Home Energy Management System) that manages the power of the consumer. The HEMS 500 is connected to the SOFC unit 100, the distribution board 300 (measurement unit 310), and the load 400 via a signal line. The HEMS 500 includes a function of controlling an operation mode of the load 400. The HEMS 500 is an example of a power management apparatus.

Figure 2:
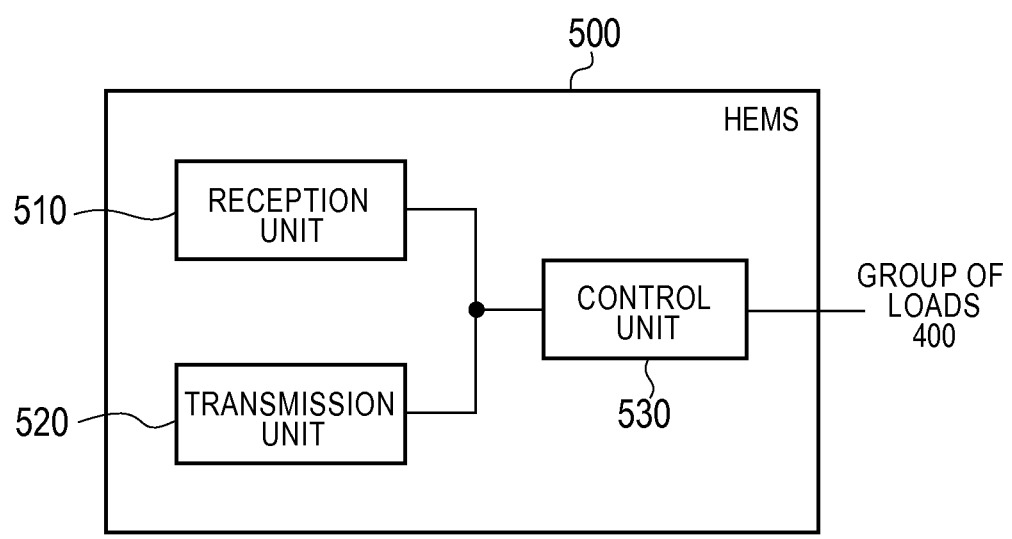
FIG. 2 is a block diagram of the HEMS 500 according to the first feature.

In particular, as shown in FIG. 2, the HEMS 500 includes a reception unit 510, a transmission unit 520, and a control unit 530.

The reception unit 510 receives various types of information from the distribution board 300 (measurement unit 310) and the load 400. Firstly, the reception unit 510 receives, from the measurement unit 310, the power (measured value) supplied from the grid 10. Alternatively, the reception unit 510 may receive, from a measurement unit provided separately of the measurement unit 310, the power consumption (measured value) of the load 400.

The power supplied from the grid 10 varies depending on the power consumption of the load 400. Therefore, it should be noted that in case of receiving, from the measurement unit 310, the power (measured value) supplied from the grid 10, the reception unit 510 acquires indirectly the power consumption of the load 400. That is, in the first embodiment, the reception unit 510 configures an acquisition unit that acquires the power consumption of the load 400.

Secondly, the reception unit 510 receives load state information indicating a state (power ON/OFF, operation mode) of the load 400, from the load 400.

The transmission unit 520 transmits various types of information to the SOFC unit 100 and the load 400. Firstly, the transmission unit 520 transmits the pseudo power consumption that is obtained by adding a predetermined offset to the power consumption of the load 400, to the SOFC unit 100.

In the first embodiment, the transmission unit 520 configures a notification unit that notifies the SOFC unit 100 of the pseudo power consumption.

Secondly, the transmission unit 520 transmits, to the load 400, load control information instructing a reduction of the power consumption of the load 400, in response to an instruction of the control unit 530. In this case, the load control information may be information instructing the load 400 to stop the operation, for example. Alternatively, the load control information may be information instructing the load 400 to change the operation mode.

The control unit 530 controls the HEMS 500. Firstly, the control unit 530 decides the pseudo power consumption that is obtained by adding a predetermined offset to the power consumption of the load 400, which is received by the reception unit 510, and instructs the transmission unit 520 to transmit the decided pseudo power consumption.

In this case, the control unit 530 may predict the power consumption of the load 400, on the basis of a history of the power consumption of the load 400. In such a case, the control unit 530 calculates the predetermined offset on the basis of the predicted power consumption. For example, the control unit 530 calculates a larger offset, as the predetermined offset, as the predicted power consumption is larger. However, the predetermined offset may be a previously defined value.

Secondly, when the power output from the SOFC unit 100 cannot follow the power consumption of the load 400, the control unit 530 instructs the transmission unit 520 to transmit the load control information instructing a reduction of the power consumption of the load 400. That is, the control unit 530 instructs a reduction of the power consumption of the load 400, when the power output from the SOFC unit 100 is insufficient even if the predetermined offset is allowed as a margin.

In this case, the control unit 530 may predict the power consumption of the load 400, on the basis of the load state information. Alternatively, the control unit 530 may predict the power consumption of the load 400, on the basis of a history of the power consumption of the load 400. In such a case, when the power output from the SOFC unit 100 cannot follow the predicted power consumption, the control unit 530 instructs a reduction of the power consumption of the load 400.

Further, in a case where a plurality of loads 400 are provided, the control unit 530 selects the load 400 the power consumption of which is to be reduced, from among the plurality of loads 400. Specifically, the control unit 530 selects the load 400 the power consumption of which is to be reduced, depending on a characteristic of each of the plurality of loads 400.

For example, the control unit 530 selects the load 400 the operation mode of which can be changed to an operation mode that consumes less power, in a case where the load 400 has a plurality of operation modes. For example, when the load 400 is an air conditioner and change from a quick cooling mode to a normal cooling mode is permitted, the control unit 530 selects the air conditioner. Further, "reduction of power consumption" in the present invention includes not only the change to the above-described low power consumption mode but also stopping of the power consumption.

(Power Management Method)

Figure 3:
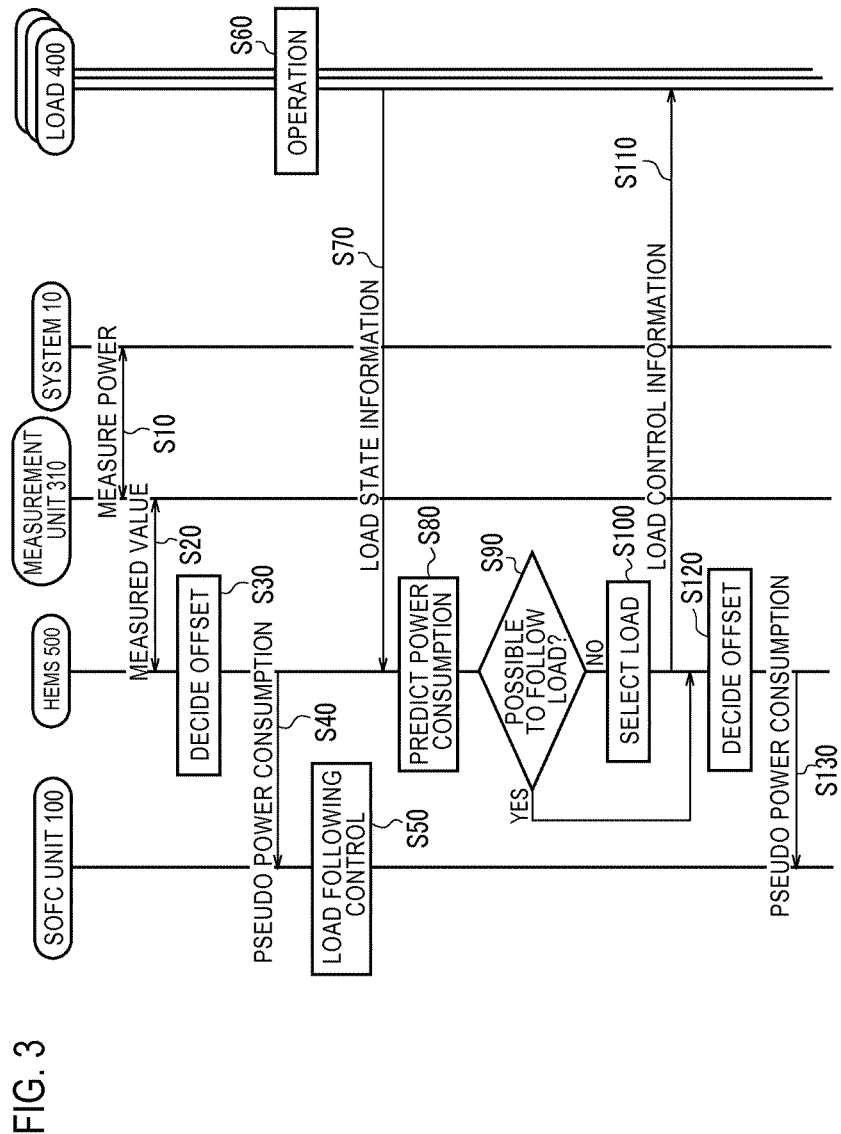
FIG. 3 is a sequence diagram showing the power management method according to the first feature.

Hereinafter, a power management method according to the first embodiment will be described. FIG. 3 is a sequence diagram showing the power management method according to the first embodiment.

As shown in FIG. 3, in step 10, the measurement unit 310 measures the power consumption of the load 400. In this case, there is shown, as an example, a case where the power supplied from the grid 10 is measured.

In step 20, the measurement unit 310 transmits the power (measured value) supplied from the grid 10, to the HEMS 500.

In step 30, the HEMS 500 decides the predetermined offset. The predetermined offset may be also decided on the basis of the history of the power consumption of the load 400. Alternatively, the predetermined offset may be a previously defined value.

In step 40, the HEMS 500 transmits the pseudo power consumption that is obtained by adding the predetermined offset to the power consumption of the load 400, to the SOFC unit 100.

In step 50, the SOFC unit 100 performs the load following control on the basis of the pseudo power consumption. That is, the SOFC unit 100 controls the power output from the SOFC unit 100 to follow the pseudo power consumption.

In step 60, a user performs a certain operation on the load 400. The operation may be switching of power ON/OFF of the load 400. Alternatively, the operation may be switching operation modes of the load 400.

In step 70, the load 400 transmits the load state information indicating a state (power ON/OFF, operation mode) of the load 400, to the HEMS 500. Alternatively, the HEMS 500 attempts to acquire the state of the load 400.

In step 80, the HEMS 500 predicts the power consumption of the load 400, on the basis of the load state information.

In step 90, the HEMS 500 determines whether or not the power output from the SOFC unit 100 can follow the predicted power consumption. The HEMS 500 completes a series of processes, when a determination result is "YES". Meanwhile, when the determination result is "NO", the HEMS 500 proceeds to a process in step 100.

In step 100, the HEMS 500 selects the load 400 the power consumption of which is to be reduced, from among the plurality of loads 400.

In step 110, the HEMS 500 transmits the load control information instructing a reduction of the power consumption of the load 400, to the load 400 selected in step 100.

In step 120, the HEMS 500 decides the predetermined offset in the same manner as in step 30.

In step 130, the HEMS 500 transmits the pseudo power consumption that is obtained by adding the predetermined offset to the power consumption of the load 400, to the SOFC unit 100, in the same manner as in step 40. In this case, the power consumption of the load 400 is a value decided in consideration of the steps 80 to 110.

(Operation and Effect)

According to the first embodiment, the HEMS 500 notifies the SOFC unit 100 of the pseudo power consumption that is obtained by adding the predetermined offset to the power consumption of the load 400. The SOFC unit 100 controls the power output from the SOFC unit 100 to follow the pseudo power consumption. In other words, the SOFC unit 100 controls the power output from the SOFC unit 100, allowing for a margin of the predetermined offset.

Therefore, a load followability is improved by the predetermined offset, without a need of providing the large-capacity battery or capacitor. That is, it is possible to restrain a cost increase of a whole system including the SOFC unit 100 and to restrain insufficiency of power supplied from the SOFC unit 100 to the load.

Other Embodiments

As described above, the present invention has been described according to the embodiment. It must not be understood that, however, the discussions and the drawings constituting a part of this disclosure limit the present invention. From this disclosure, various alternative embodiments, examples and operational techniques will be apparent to those skilled in the art.

Although not particularly described in the embodiment, the control unit 530 may determine whether or not to reduce the power consumption of the load 400 on the basis of a difference between rated power of the SOFC unit 100 and current output. For example, the control unit 530 determines to reduce the power consumption of the load 400 when the difference between rated power of the SOFC unit 100 and current output is equal to or less than a predetermined threshold value.

Although not particularly described in the embodiment, the control unit 530 may determine whether or not to reduce the power consumption of the load 400 on the basis of whether a photovoltaic cell is provided. For example, the control unit 530 determines to reduce the power consumption of the load 400 when no photovoltaic cell is provided.

Although not particularly described in the embodiment, the control unit 530 may determine whether or not to reduce the power consumption of the load 400 on the basis of an amount of power output from a photovoltaic cell, in a case where the photovoltaic cell is provided. For example, the control unit 530 determines to reduce the power consumption of the load 400 when the amount of power output from the photovoltaic cell is equal to or less than a predetermined threshold value.

Although not described in the embodiment, the power consumption of the load 400 acquired by the reception unit 510 may be a value obtained in consideration of the power supplied from a photovoltaic cell. For example, the power consumption of the load 400 may be a value obtained by subtracting the power supplied from a photovoltaic cell from power consumption (power actually consumed by the load 400) measured by a measurement unit provided separately of the measurement unit 310.

Further, the power consumption of the load 400, which is predicted by the control unit 530, may be a value obtained in consideration of a predicted value of the power supplied from a photovoltaic cell. The predicted power consumption of the load 400 may be a value obtained by subtracting a predicted value of the power supplied from the photovoltaic cell from a predicted value of the power consumption of the load 400.

Although not particularly described in the embodiment, the control unit 530 may determine whether or not to reduce the power consumption of the load 400 on the basis of an amount of power stored in a storage battery, in a case where the storage battery is provided. For example, the control unit 530 determines to reduce the power consumption of the load 400 when the amount of power stored in the storage battery is equal to or less than a predetermined threshold value. In this case, the control unit 530 may discharge the storage battery rather than reducing the power consumption of the load 400 when the amount of power stored in the storage battery is equal to or more than a predetermined threshold value.

Although not described in the embodiment, the power consumption of the load 400 that is acquired by the reception unit 510 may be a value obtained in consideration of an amount of power charged into and discharged from a storage battery. For example, the power consumption of the load 400 may be a value obtained by subtracting the amount of power discharged from the storage battery from power consumption (power consumption actually by the load 400) measured by a measurement unit provided separately of the measurement unit 310. Alternatively, the power consumption of the load 400 may be a value obtained by adding the amount of power charged in the storage battery to the power consumption (power actually consumed by the load 400) measured by the measurement unit provided separately of the measurement unit 310.

Although not particularly described in the embodiment, the control unit 530 may manage a plurality of loads 400 for each category having a defined priority.

For example, the load 400 is classified into three categories (categories A to C). The category A is a category to which a load, for example, indispensable in a daily life, belongs (for example, a refrigerator). The category B is a load (for example, lighting and an air conditioner) directly related to a daily life, among loads not belonging to the category A. The category C is a load (for example, TV) not belonging to the category A nor the category B. In this case, the category A has the highest priority, and the category C has the lowest priority.

In such a case, the control unit 530 selects the load 400 belonging to a category having a lower priority, as the load 400 the power consumption of which is to be reduced.

In the embodiment, as the power management apparatus, the HEMS 500 is described as an example. However, the power management apparatus may be a BEMS (Building and Energy Management System) or an FEMS (Factory Energy Management System), for example.

Although not particularly described in the embodiment, a function of the control unit 530 may be provided in an apparatus other than the HEMS 500. For example, the SOFC controller 130 or the distribution board 300 may include the function of the control unit 530.

Although not particularly described in the embodiment, communication in a network configured by the HEMS 500 and each equipment (the SOFC unit 100, the distribution board 300, and the load 400) is preferably performed in compliance with a predetermined protocol (ECHONET Lite, ZigBEE SEP2.0, KNX, etc.). In such a case, between the HEMS 500 and each equipment (the SOFC unit 100, the distribution board 300, and the load 400), various types of commands are communicated in a format defined in a predetermined protocol. For example, the pseudo power consumption that is notified by the HEMS 500 to the SOFC unit 100, the power consumption notified by the load 400 to the HEMS 500, the load state information (power ON/OFF, operation mode) notified by the load 400 to the HEMS 500, and operation mode designation information (information for designating an operation mode of the load 400) notified by the HEMS 500 to the load 400 are notified in a format defined in a predetermined protocol.

Note that the entire content of the Japanese Patent Application No. 2011-213564 (filed on Sep. 28, 2011) is incorporated herein by reference.

INDUSTRIAL APPLICABILITY

According to the present invention, it is possible to provide a power management system, power management apparatus, and power management method, with which it is possible to restrain shortage of power supplied from the fuel cell unit to the load while restraining a cost increase.

The invention claimed is:

1. A power management system comprising:
a fuel cell unit configured to perform a load following operation for controlling an output power to follow a target output power and
a power management apparatus, the power management apparatus comprising:
an acquisition unit configured to acquire power consumption of a load;
a notification unit configured to notify the fuel cell unit of pseudo power consumption as the target output power, the pseudo power consumption being obtained by adding a positive offset to the power consumption acquired by the acquisition unit; and
a control unit configured to predict the power consumption of the load, and calculate the positive offset based on the predicted power consumption,
wherein
the control unit calculates a larger value for the positive offset as the predicted power consumption is larger, and
the fuel cell unit controls power output from the fuel cell unit to follow the pseudo power consumption.

2. The power management system according to claim 1, wherein the power management apparatus comprises a control unit configured to predict the power consumption of the load and reduce the power consumption of the load when the power output from the fuel cell unit cannot follow the predicted power consumption.

3. The power management system according to claim 1, wherein
as the load, a plurality of loads are provided,
the power management apparatus comprises a control unit configured to reduce the power consumption of the load selected from among the plurality of loads when the power output from the fuel cell unit cannot follow the power consumption of the plurality of loads, and
the control unit selects the load the power consumption of which is to be reduced, depending on a characteristic of each of the plurality of loads.

4. A power management apparatus connected to a fuel cell unit configured to perform a load following operation for controlling an output power to follow a target output power, comprising:
an acquisition unit that acquires power consumption of a load;
a notification unit that notifies the fuel cell unit of pseudo power consumption as the target output power, the pseudo power consumption being obtained by adding a positive offset to the power consumption acquired by the acquisition unit; and
a control unit configured to predict the power consumption of the load, and calculate the positive offset based on the predicted power consumption,
wherein the control unit calculates a larger value for the positive offset as the predicted power consumption is larger.

5. A power management method comprising:
performing, by a fuel cell unit, a load following operation for controlling an output power to follow a target output power, comprising:
acquiring power consumption of a load;
notifying the fuel cell unit of pseudo power consumption as the target output power, the pseudo power consumption being obtained by adding a positive offset to the power consumption;
predicting the power consumption of the load;
calculating the positive offset based on the predicted power consumption, wherein a larger value for the positive offset is calculated as the predicted power consumption is larger; and
controlling power output from the fuel cell unit to follow the pseudo power consumption.

* * * * *